United States Patent

Bedrossian et al.

[11] Patent Number: 5,853,305
[45] Date of Patent: Dec. 29, 1998

[54] CONNECTION CLIP TO A BUSBAR FOR A DRAW-IN MULTIPOLE CIRCUIT BREAKER OR SYSTEM

[75] Inventors: Antoine Bedrossian, Meylan; Philippe Langlois, Saint - Lattier; Pascal Lepretre, Les Marches; Robert Morel, Herbeys; Pascale Rodriguez, Golles; Gilbert Velletaz, StPierre d'Albigny, all of France

[73] Assignee: Schneider Electric S.A., France

[21] Appl. No.: 849,188

[22] PCT Filed: Dec. 1, 1992

[86] PCT No.: PCT/FR95/01582

§ 371 Date: May 30, 1997

§ 102(e) Date: May 30, 1997

[87] PCT Pub. No.: WO96/18199

PCT Pub. Date: Jun. 13, 1996

[30] Foreign Application Priority Data

Dec. 6, 1994 [FR] France ................................. 94/14883

[51] Int. Cl.[6] ................................................... H01R 9/24
[52] U.S. Cl. ............................................. 439/787; 439/936
[58] Field of Search .................................... 439/787, 931, 439/178, 936

[56] References Cited

U.S. PATENT DOCUMENTS

| 4,983,132 | 1/1991 | Weidler | 439/787 |
| 5,236,628 | 8/1993 | Capp | 252/503 |

FOREIGN PATENT DOCUMENTS 0208565  1/1987  European Pat. Off. .

Primary Examiner—Steven L. Stephan
Assistant Examiner—T. C. Patel
Attorney, Agent, or Firm—Parkhurst & Wendel, L.L.P

[57] ABSTRACT

A connection clip electrically connects one of the contact terminal strips of a circuit breaker to a terminal strip for connection to a busbar. At least one opposed pair of independent contact fingers in the form of a bridge is made of conducting material and each opposed pair of contact fingers has two end contacts. The two independent contact fingers press via their end contacts respectively on the two opposite faces of either a terminal strip or busbar, and are urged elastically towards one another by the action of springs compression fitted between a connection frame and a bearing surface of the independent pairs of contact fingers. The independent pairs of contact fingers are covered by a coating containing carbon which provides lubrication to facilitate draw-in of the clip, while reducing the risks of welding at the level of the contact points.

7 Claims, 1 Drawing Sheet

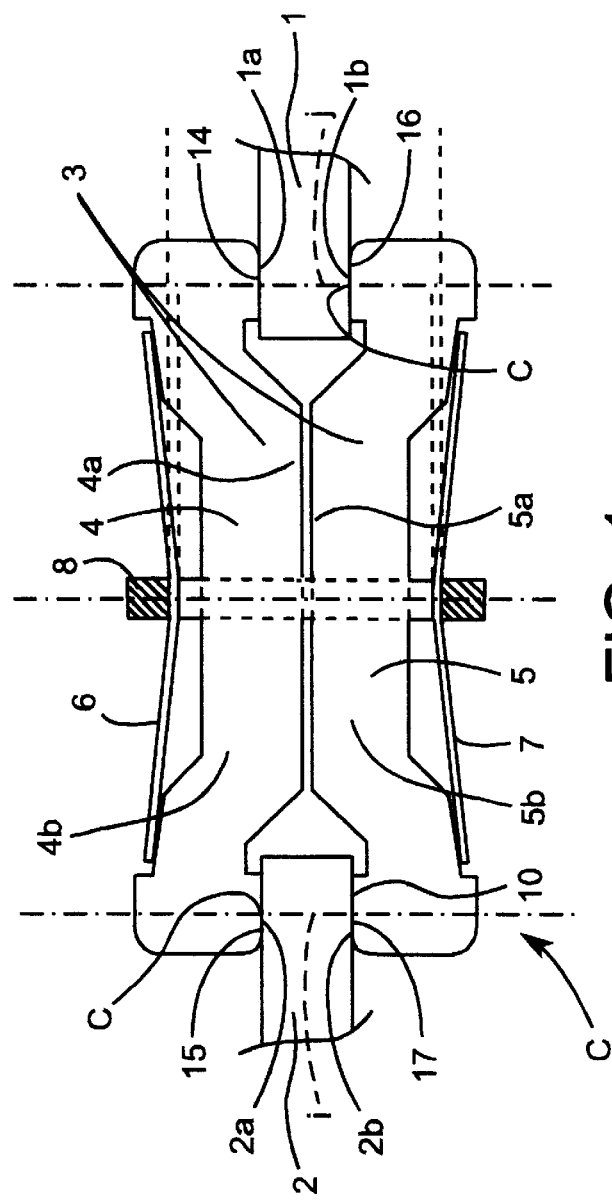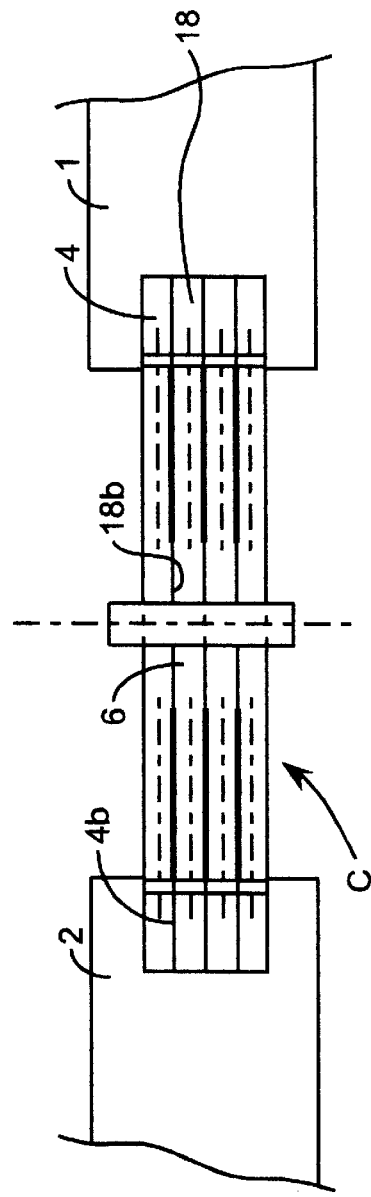

CONNECTION CLIP TO A BUSBAR FOR A DRAW-IN MULTIPOLE CIRCUIT BREAKER OR SYSTEM

The present invention relates to a connection clip designed for example to electrically connect one of the contact terminal strips of a circuit breaker to a terminal strip for connection to a busbar or similar, said clip comprising at least one pair of opposite contact fingers in the form of a bridge made of conducting material, the two fingers of each pair each comprising two end contacts by means of which they are pressing on the two opposite faces of the above-mentioned two terminal strips and are urged elastically towards one another by the action of flexible elements cooperating with said contact fingers.

A draw-in clip of the kind mentioned above is described in the Patent document FR-2,583,217 file by the applicant. At present, the contact fingers are made of copper and are covered with a coating made of pure silver or of tin. The draw-in clips constructed in this manner do however present a certain number of shortcomings. One of these shortcomings is that, in the event of a short-circuit, a fusion phenomenon often occurs between the end contacts of the fingers and the terminal strips, which can lead to welding of the contact parts. Another of these shortcomings is that when connection is performed the clips require a high draw-in force. Finally, when they comprise several pairs of juxtaposed contact fingers, it is observed that these adjoined fingers are not perfectly independent, which results in reduced quality of the contact between the fingers and terminal strips.

The present invention overcomes these problems and proposes a connection clip comprising one or several pairs of independent contact fingers, for which the risks of welding at the contact points are considerably reduced, as are the draw-in forces, the contact fingers moreover being perfectly independent.

For this purpose, the object of the present invention is to achieve a connection clip characterized in that the above-mentioned contact fingers comprise, at least on their end contacts, a coating containing graphite so as to provide lubrication of the covered parts which facilitates draw-in of the clip while reducing the risks of welding at the level of the contact points.

According to a particular feature of the invention, said clip comprising several pairs of juxtaposed indepenant contact fingers, the side faces of the fingers are also covered, at least partially, by the above-mentioned coating in order to reduce the friction between the two facing surfaces of two adjoined fingers.

According to a particular embodiment of the invention, the whole of the surface of the fingers is covered by the above-mentioned coating.

According to another feature, the above-mentioned coating is obtained by electrolytic means.

Advantageously, the above-mentioned coating comprises a silver and graphite alloy.

According to another advantageous feature, the above-mentioned coating comprises about 2% of carbon.

According to another feature, the thickness of the coating is about 5 $\mu$m.

According to another feature, the contact fingers, prior to the coating being deposited, are made of copper.

According to another feature, the two fingers of each pair respectively comprise two internal centre faces facing one another and very close together, these faces extending appreciably over the whole length separating the two terminal strips.

But other advantages and features of the invention will become more clearly apparent from the following detailed description referring to the accompanying drawings given as an example only and in which:

FIG. 1 is a partial elevational view of a particular embodiment of a connection grip according to the invention.

FIG. 2 is a top view.

In the figures, a draw-in clip C can be seen designed to electrically connect one of the contact terminal strips 1 of a withdrawable type low-voltage multipole circuit breaker to a connection terminal strip 2 for connection to a busbar (not represented). This low-voltage circuit breaker is movable in two-way translation between two draw-in and draw-out end of travel positions by actuating an auxiliary operating mechanism (not represented).

This draw-in clip C comprises a plurality of pairs 3 of opposed elementary independent contact fingers 4, 5 cooperating with compression springs in the form of blades 6, 7 located on each side of the fingers 4, 5, the assembly being arranged inside a connection frame 8. Each elementary contact finger 4, 5 is shaped as a bridge made of conducting material, preferably copper, extending in the longitudinal direction of draw-in and comprising two end contacts 14, 15 and 16, 17. These end contacts 14 to 17 of the two fingers are designed to press respectively against the two opposite faces 1a, 2a; 1b, 2b of the two terminal strips 1 and 2.

The opposite contact fingers 4, 5 of each pair 3 are urged elastically towards one another by the compression action of the springs 6, 7, leaving at each end of the clip C a gap i, j between the protuberances of the end contacts 14 to 17. The gap i enables the clip C to be fixed onto the above-mentioned connection terminal strip 2, whereas the opposite gap j is designed for draw-in of the corresponding circuit breaker contact strip 1 when translation of the circuit breaker takes place.

According to a particular embodiment of the invention, these contact fingers 4, 5 are subjected to an electrolytic treatment by which they are totally covered with a layer of a coating 10 formed mainly by an alloy containing graphite (or carbon). Advantageously, this alloy will be a silver/graphite alloy, the carbon content of this coating 10 will be 2% and the thickness of the coating 10 will be 5 $\mu$m. The presence of this coating enables a lubricated external surface of the contact fingers 4, 5 to be obtained.

Thus, due to these features, the successive fitting of the draw-in clip C on the connection terminal strip 2 and of the circuit breaker contact terminal strip 1 inside the clip C require a lower draw-in force without adding grease. The same is the case for removal of the clip C.

In operation, when the current flows through the clip C, the risks of welding at the contact points between the fingers 4, 5 and terminal strips 1, 2 are particularly reduced due to the presence of the carbon at the surface of the fingers 4, 5.

When the clip C is a multi-contact grip and comprises several pairs 3 of independent contact fingers 4, 5, for example four as illustrated in FIG. 2, the presence of this coating 10 on the side faces 4b, 18b of the FIGS. 4, 18 enables the friction between two juxtaposed fingers 4, 5 to be considerably reduced. As the fingers are more independent, this has the result of favouring a large number of contact points throughout the duration of the short-circuit, thereby improving the quality of the electrical connection.

It should moreover be noted referring more particularly to FIG. 1 that the contact fingers 4, 5 respectively comprise two internal centre faces 4a, 5a facing one another and very close together. These faces extend appreciably over the whole length separating the connection terminal strip 2 from the contact terminal strip 1. This arrangement enables the current streams flowing in the opposite fingers 4, 5 to be brought closer together, this bringing together generating electrodynamic attraction forces of the fingers so as to compensate the repelling forces exerted at the level of the contact points p when the current is flowing.

A connection clip has therefore been achieved by means of the invention which is easier to fit, which extends the limits defined by welding problems at the contact points, and improves the contact quality, and therefore the electrical connection quality.

The invention is naturally in no way limited to the embodiment described and illustrated herein which has been given as an example only. On the contrary, the invention encompasses all the technical equivalents of the means described and combinations thereof if the latter are achieved according to the spirit of the invention.

We claim:

1. A connection clip for electrical connection between a contact terminal strip of a circuit breaker and a busbar, the connection clip comprising:

a plurality of opposed pairs of independent contact fingers forming a bridge; each opposed pair of contact fringes having contact ends made of a conductive material and having a space therebetween; and means for elastically urging the opposed pairs of independent contact fingers toward each other so that the contact ends of each opposed pair of independent contact fingers electrically connects to one of said terminal strip and a busbar that is drawn into the space between an opposed pair of the independent contact fingers; wherein a friction-reducing coating containing graphite is disposed on the contact ends to facilitate draw-in of one of said terminal strip and busbar; and a plurality of sides of the independent contact fingers are graphite-coated to reduce friction between lateral surfaces of the independent contact fingers.

2. The connection clip according to claim 1 wherein the friction-reducing coating is disposed on all of the pairs of independent contact fingers.

3. The connection clip according to claim 1 wherein the friction-reducing coating comprises a silver and graphite alloy.

4. The connection clip according to claim 1 wherein the friction-reducing coating is comprised of 2% carbon.

5. The connection clip according to claim 1 wherein the thickness of the coating is about 5 $\mu$m.

6. The connection clip according to claim 1 wherein the independent contact fingers are made of copper.

7. The connection clip according to claim 1, wherein each pair of opposed pairs of independent contact fingers comprises complementary internal center faces extending over the length of the connection clip separating the terminal strip and busbar.

\* \* \* \* \*

UNITED STATES PATENT AND TRADEMARK OFFICE
CERTIFICATE OF CORRECTION

PATENT NO. : 5,853,305
DATED : December 29, 1998
INVENTOR(S) : Antoine BEDROSSIAN et al.

It is certified that error appears in the above-indentified patent and that said Letters Patent is hereby corrected as shown below:

On the title page, Item [22] PCT Filed: change "Dec. 1, 1992" to --Dec. 1, 1995--.

Signed and Sealed this

Eighteenth Day of May, 1999

Attest:

Attesting Officer

Q. TODD DICKINSON

Acting Commissioner of Patents and Trademarks